United States Patent
Eckert et al.

(10) Patent No.: US 6,913,328 B2
(45) Date of Patent: Jul. 5, 2005

(54) SYSTEM AND METHOD FOR CONTROLLING BRAKE ACTUATION ENERGY IN ELECTRONICALLY-CONTROLLED BRAKE SYSTEMS OF TRACTOR AND TRAILER VEHICLE COMBINATIONS

(75) Inventors: Horst Eckert, Rehburg-Loccum (DE); Arnd Gaulke, Ronnenberg (DE)

(73) Assignee: WABCO GmbH & Co. oHG, Hannover (DE)

(*) Notice: Subject to any disclaimer, the term of this patent is extended or adjusted under 35 U.S.C. 154(b) by 0 days.

(21) Appl. No.: 10/426,949

(22) Filed: Apr. 29, 2003

(65) Prior Publication Data

US 2004/0041464 A1 Mar. 4, 2004

(30) Foreign Application Priority Data

Apr. 29, 2002 (DE) .......................................... 102 19 040

(51) Int. Cl.⁷ ................................................ B60T 8/32
(52) U.S. Cl. ...................... 303/191; 303/7; 188/1.11 R; 188/1.11 E; 188/112 R
(58) Field of Search ............................. 303/17, 7, 20, 303/22.1, 9.62, 191; 188/181 T, 112 R, 349, 1.11 E, 1.11 R

(56) References Cited

U.S. PATENT DOCUMENTS

| | | | |
|---|---|---|---|
| 4,674,326 A | | 6/1987 | Reinecke |
| 4,685,745 A | | 8/1987 | Reinecke |
| 4,790,606 A | | 12/1988 | Reinecke |
| 4,804,237 A | * | 2/1989 | Gee et al. ........................ 303/7 |
| 4,964,679 A | * | 10/1990 | Rath ........................... 303/146 |
| 5,403,073 A | * | 4/1995 | Frank et al. .................... 303/7 |
| 5,615,931 A | * | 4/1997 | Stumpe et al. ............. 303/22.1 |
| 5,669,678 A | * | 9/1997 | Stumpe et al. .............. 303/155 |
| 5,992,579 A | * | 11/1999 | Kyrtsos .................... 188/79.52 |
| 6,139,118 A | * | 10/2000 | Hurst et al. ..................... 303/7 |
| 6,273,522 B1 | * | 8/2001 | Feetenby et al. ............... 303/7 |
| 6,286,992 B1 | * | 9/2001 | Kyrtsos ....................... 374/45 |

FOREIGN PATENT DOCUMENTS

| | | |
|---|---|---|
| DE | 40 07 360 A1 | 9/1991 |
| DE | 40 20 693 A1 | 2/1992 |

(Continued)

*Primary Examiner*—Matthew C. Graham
*Assistant Examiner*—Mariano Sy
(74) *Attorney, Agent, or Firm*—Kramer Levin Naftalis & Frankel LLP

(57) ABSTRACT

A system and method for controlling brake actuation energy in electronically controlled brake systems of tractor and trailer vehicle combinations. The temperatures of the brakes of the tractor and trailer vehicle parts are determined and compared with one another and with a preset temperature limit value. If the determined temperatures differ by at least a preset value and the temperatures of the brakes of at least one vehicle part reach the temperature limit, less brake actuation energy is provided to the brakes of the vehicle part having the higher temperatures, while more brake actuation energy is provided to the brakes of the vehicle part having the lower temperatures, and coupling force control is deactivated or programmed to adjust a coupling force which is not zero but the magnitude of which depends on the temperature induced changes of the brake actuation energy.

31 Claims, 2 Drawing Sheets

FOREIGN PATENT DOCUMENTS

| | | |
|---|---|---|
| DE | 42 08 581 A1 | 5/1993 |
| DE | 41 42 670 A1 | 6/1993 |
| DE | 42 24 971 A1 | 2/1994 |
| DE | 44 18 768 A | 12/1995 |
| DE | 195 28 553 A1 | 2/1996 |
| DE | 197 13 561 C1 | 5/1998 |
| DE | 197 07 207 A1 | 8/1998 |
| DE | 197 26 116 A1 | 1/1999 |
| DE | 199 33 961 A1 | 9/2000 |
| DE | 100 12 448 A1 | 10/2001 |
| DE | 101 06 374 A1 | 9/2002 |
| EP | 0 188 685 B1 | 7/1986 |
| EP | 0 189 082 A2 | 7/1986 |
| EP | 0 247 253 A | 12/1987 |
| EP | 0 288 846 A2 | 11/1988 |
| EP | 0 320 602 B1 | 6/1989 |
| EP | 0 417 431 B1 | 3/1991 |
| EP | 0 421 066 A | 4/1991 |
| EP | 0 569 697 B1 | 11/1993 |
| EP | 0 569 698 B1 | 11/1993 |

* cited by examiner

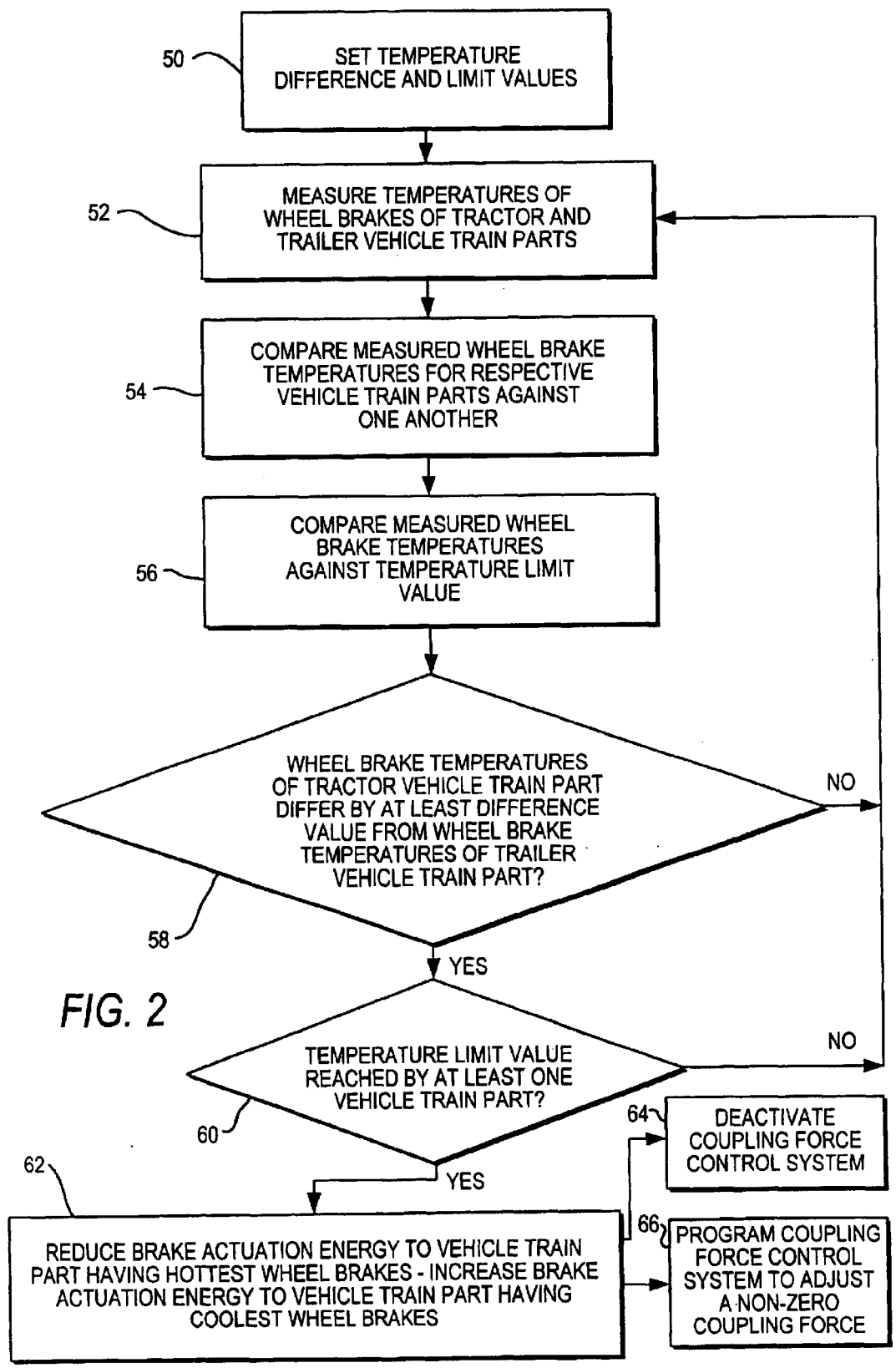

SYSTEM AND METHOD FOR CONTROLLING BRAKE ACTUATION ENERGY IN ELECTRONICALLY-CONTROLLED BRAKE SYSTEMS OF TRACTOR AND TRAILER VEHICLE COMBINATIONS

BACKGROUND OF THE INVENTION

The present invention is directed generally to a system and method for controlling brake actuation energy in electronically controlled brake systems ("EBSs") of tractor and trailer vehicle combinations.

In tractor and trailer vehicle combinations ("vehicle trains"), it is known to superpose coupling force control on the electronic control of brake actuation energy in order to control the set pressure of the trailer vehicle train part. The objective of such coupling force control is a coupling force of zero, so that no force at all or only a force of small magnitude (tolerance range) is transmitted via the trailer coupling from the trailer vehicle train part to the tractor vehicle train part, or vice-versa, during braking.

If the wheel brakes of the tractor and trailer vehicle train parts develop different wheel brake temperatures, e.g., due to different distribution of load between the tractor vehicle train part and the trailer vehicle train part, the braking power of the wheel brakes having higher temperatures will be less than the braking power of the wheel brakes having lower temperatures at the same brake actuation energy, resulting in a non-zero coupling force. By virtue of the zero coupling force control objective of the coupling force control system, a shift of brake actuation energy to the vehicle train part having the hotter wheel brakes is effected. This can present a possible overheating situation and associated undesired reduction in braking power if the temperatures of the wheel brakes reach a defined limit value.

Accordingly, it is desired to provide an improved system and method for controlling brake actuation energy in a vehicle train equipped with a coupling force control system that compensate for the zero coupling force control objective of the coupling force control system when appropriate to prevent overheating of wheel brakes during braking and undesired reduction in braking power.

SUMMARY OF THE INVENTION

Generally speaking, in accordance with the present invention, an improved system and method for effecting temperature dependent control of brake actuation energy in EBSs of tractor and trailer vehicles in a vehicle train equipped with a coupling force control system are provided that compensate for the zero coupling force control objective of the coupling force control system when appropriate to prevent overheating of wheel brakes during braking and undesired reduction in braking power.

In the system and method of the present invention, the temperatures of the wheel brakes of the tractor and trailer vehicle train parts are determined. The determined temperatures are compared against one another for the respective vehicle train parts and against a preset temperature limit value. If, during braking, the temperatures of the wheel brakes for respective vehicle train parts differ from one another by at least a preset value and the temperatures of the wheel brakes of at least one of the vehicle train parts reach the preset temperature limit, the provision of brake actuation energy (e.g., brake pressure) to the tractor vehicle train part and/or trailer vehicle train part is controlled such that a reduction in brake actuation energy is effected for the wheel brakes of the vehicle train part having higher temperatures, and an increase in brake actuation energy is effected for the wheel brakes of the vehicle train part having lower temperatures.

According to the present invention, the coupling force control system is either deactivated or programmed to adjust a non-zero coupling force based on the temperature-induced changes of brake actuation energy of the vehicle train parts. Thus, for a vehicle train comprising a tractor vehicle train part and a trailer vehicle train part, in addition to conventional coupling force control, higher priority brake actuation energy control based on wheel brake temperature is provided, such that the control objective, in any situation in general or in the presence of coupling force control in particular, is not solely a coupling force of zero, but is instead protection of the wheel brakes of the vehicle train part having higher temperatures when temperatures reach a limit value and differ by a defined value from the temperatures of the wheel brakes of the other vehicle train part. What this means is that, for example, less brake actuation energy is provided to the wheel brakes of the trailer vehicle train part (i.e., than was the case before the temperature limit value was reached) if the wheel brake temperatures of the trailer vehicle train part are higher than the wheel brake temperatures of the tractor vehicle train part; and more brake actuation energy is provided to the wheel brakes of the trailer vehicle train part (i.e., than was the case before the temperature limit value was reached) if the wheel brake temperatures of the trailer vehicle train part are lower than the wheel brake temperatures of the tractor vehicle train part. In such case, the coupling force is not corrected to zero; instead, a non-zero coupling force is permitted.

In another embodiment of the system and method according to the present invention, mean values, specific to the vehicle train parts, of the temperatures of the wheel brakes are compared and evaluated.

According to another embodiment of the present invention, the brake actuation energy of the trailer vehicle train part or the set brake actuation energy of the trailer vehicle train part can be varied not only as a function of temperature differences and temperature levels but also as a function of the ratio of the peak temperatures of one or more wheel brakes to the average temperature of all wheel brakes of the vehicle train or as a function of the level of the absolute peak temperature of one or more wheel brakes of the vehicle train.

The temperatures of the wheel brakes can be measured by means of temperature sensors or they can be calculated according to a temperature model, which takes into consideration a brake load signal representative of the load condition of the wheel brakes, or the heat supply to the wheel brakes, or the deformation of brake components, or the instantaneous vehicle train deceleration and the vehicle train speed, or other suitable parameters.

In a further embodiment of the present invention, a signal warning the vehicle train driver of an overheating condition during braking and the possibility of undesired reduction in braking power can be generated, for example, by brake pedal feel and/or by a visual and/or audible indicator.

Accordingly, it is an object of the present invention to provide a system and method for controlling brake actuation energy in EBSs of tractor and trailer vehicles of a vehicle train that overcome disadvantages associated with prior art systems and methods.

It is a further object of the present invention to provide an improved system and method for effecting temperature dependent control of brake actuation energy in EBSs of vehicle train parts in a vehicle train equipped with a coupling force control system that compensate for the zero coupling force control objective of the coupling force control system when appropriate to prevent overheating of wheel brakes during braking and undesired reduction in braking power.

Still other objects of the present invention will in part be obvious and will in part be apparent from the specification.

The present invention accordingly comprises the various steps and the relation of one or more of such steps with respect to each of the others, and embodies features of construction, combinations of elements, and arrangement of parts which are adapted to effect such steps, all as exemplified in the following detailed disclosure, and the scope of the invention will be indicted in the claims.

BRIEF DESCRIPTION OF THE DRAWINGS

For a fuller understanding of the invention, reference is had to the following description taken in connection with the accompanying drawings in which:

FIG. 2 is a flow chart depicting process steps for effecting control of brake actuation energy as a function of wheel brake temperature in a tractor and trailer vehicle combination equipped with EBSs according to a preferred embodiment of the method of the present invention.

DETAILED DESCRIPTION OF THE PREFERRED EMBODIMENTS

Figure 1:
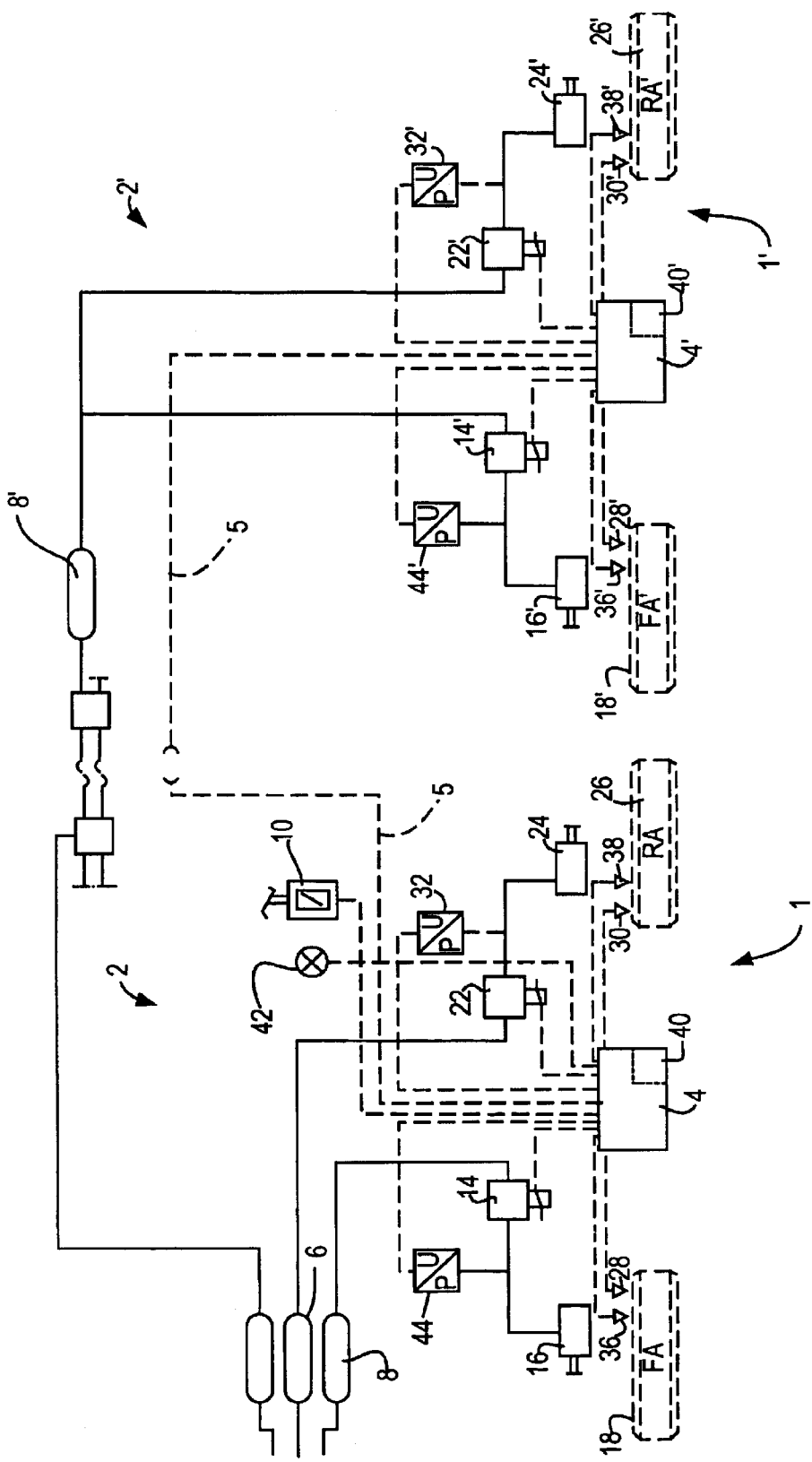
FIG. 1 is a schematic diagram depicting EBS control electronics provided in a tractor and trailer vehicle combination constructed and arranged according to the system and method of the present invention to effect temperature dependent control of brake actuation energy.

The term "brake actuation energy" as used herein is to be understood as encompassing all physical variables that cause a vehicle train wheel brake supplied therewith to generate braking power. Examples of brake actuation energy are electrical variables such as current and voltage, or mechanical variables such as pressure. In the case of pressure as the brake actuation energy, pressurized liquids or gases, such as compressed air, can be used as the energy carrier.

Referring now to FIG. 1, in which energy conduits, such as, for example, pressure conduits, are depicted in solid lines and electrical conductors are depicted in broken lines, there is shown a schematic diagram of a vehicle train including a tractor vehicle train part 1 and a trailer vehicle train part 1'. Tractor and trailer vehicle train parts 1 and 1' are equipped with EBSs 2 and 2', respectively, which, for example, can be pneumatically operated.

For both front axles FA, FA' and rear axles RA, RA' of vehicle train parts 1, 1', only the wheels and associated components, such as pneumatic components, of one side of the vehicle train are depicted in FIG. 1.

EBSs 2 and 2' preferably include central control units 4, 4', respectively, for control of brake actuation energy. Central control units 4, 4' can also desirably include an integrated anti-lock brake system ("ABS"). Central control units 4, 4' are preferably electrically connected to one another via a signal circuit 5.

Energy, such as, for example, compressed air, needed for actuation of the vehicle train brakes is preferably stored in energy accumulators 6, 8, 8' (e.g., compressed air reservoirs).

Preferably, a brake signal transmitter 10 in tractor vehicle train part 1 is provided for use by the vehicle train driver to input a set value to EBSs 2, 2'.

Each of EBSs 2, 2' preferably includes two circuits. One circuit includes energy allocators 14, 14', such as, for example, pressure modulators, electrically connected to brake actuation devices 16, 16', such as, for example, brake cylinders, for wheels having wheel brakes 18, 18' on front axles FA, FA'. The other circuit includes further energy allocators 22, 22' (e.g., pressure modulators) electrically connected to brake actuation devices 24, 24' (e.g., brake cylinders) for wheels having wheel brakes 26, 26' on rear axles RA, RA'.

Wheel sensors 28, 28', 30, 30' are preferably used to monitor how the vehicle train wheels are revolving. If the wheels exhibit a lockup tendency, control units 4, 4' or the ABS integrated in the control units transmit, in known manner, electrical signals to energy allocators 14, 14', 22, 22' which reduce brake actuation energy, such as, for example, brake pressure, and are thus able to eliminate lockup tendency.

Central control units 4, 4' preferably include inputs for energy sensors 32, 32', 44, 44', such as, for example, pressure sensors, for determination of brake actuation energy, such as, for example, brake pressures, in brake actuation devices 16, 16', 24, 24' (e.g., brake cylinders) of front and rear axles FA, FA', RA, RA'. Central control units 4, 4' also desirably include inputs for devices 36, 36', 38, 38', such as, for example, temperature sensors, for measuring the temperatures of wheel brakes 18, 18', 26, 26', preferably continuously.

Central control units 4, 4' are preferably adapted to compare the determined temperatures of wheel brakes 18, 18', 26, 26' of the wheels of vehicle train parts 1, 1' with one another for the respective vehicle train part, and with a preset temperature limit value. If, during braking, the determined temperatures differ from one another by at least a preset value and the temperatures of the wheel brakes of at least one of vehicle train parts 1, 1' equal or exceed the preset temperature limit value, less brake actuation energy (e.g., a lower brake pressure) is provided to the wheel brakes of the vehicle train part having higher wheel brake temperatures (i.e., than was the case before the temperature limit value was reached), while more brake actuation energy (e.g., a higher brake pressure) is provided to the wheel brakes having lower temperatures (i.e., than was the case before the temperature limit value was reached). For this purpose, one or more suitable additional electronic devices 40, 40' in central control units 4, 4' and/or corresponding program expansions in the computer processors contained in the central control units can be provided. The corresponding distribution of brake actuation energy between wheel brakes 18, 18', 26, 26' of vehicle train parts 1, 1', wherein, for example, lower pressure is provided to the brake cylinders of the hotter brakes, is preferably brought about via energy allocators 14, 14', 22, 22' of EBSs 2, 2', but can also be achieved via separate energy allocators (not shown in FIG. 1).

According to the present invention, when a coupling force control system is present, it is either deactivated or programmed to adjust a coupling force which is not zero but the magnitude of which depends on the temperature induced changes of the brake actuation energy of the vehicle train parts.

EBSs 2, 2' can be programmed such that the set brake actuation energy of the trailer vehicle train part or the set brake actuation energy of the tractor vehicle train part is lowered or raised as a function of the determined wheel brake temperatures. Also, EBSs 2, 2' can be programmed such that, when the set brake actuation energy of the trailer vehicle train part is lowered, the set brake actuation energy of the tractor vehicle train part is simultaneously raised, and, when the set brake actuation energy of the trailer vehicle train part is raised, the set brake actuation energy of the tractor vehicle train part is simultaneously lowered. Such changes of set brake actuation energy of the vehicle train parts can have a neutral effect on total braking power or, if necessary, cause a reduction in total braking power.

In one embodiment of the present invention, mean temperature values specific to the vehicle train parts are determined from the temperatures of the wheel brakes, and are compared with one another and with the preset temperature limit value.

The brake actuation energy or the set brake actuation energy can be varied not only as a function of temperature differences and temperature levels, but also as a function of the ratio of peak temperatures of one or more wheel brakes to the mean temperature of all wheel brakes or as a function of the level of the absolute peak temperatures of one or more wheel brakes.

In addition, there is preferably provided, parallel to the temperature dependent brake control, a capability for warning the vehicle train driver of an overheating condition during braking and the possibility of undesired reduction in braking power. The warning can be communicated to the driver via brake pedal feel and/or via an indicator 42 (visual and/or audible).

Brake temperature can be ascertained directly or indirectly in various ways via temperature models. For example, brake temperature can be measured by means of temperature sensors, which can be disposed in the immediate vicinity of one of the brake elements, such as the brake disk. Also, brake temperature can be ascertained via a brake load signal, which is representative of the load condition of the brakes and which links the vehicle train speed with the pressing force of the brake disks in such a way that the resulting increase in brake disk temperature is determined and a preset temperature input value is appropriately raised. Additionally, brake temperature can be determined by (i) calculating the heat energy supply to the brakes from the decrease of kinetic energy of the vehicle train during braking, (ii) from the deformation of brake components, (iii) from the instantaneous vehicle train deceleration and the vehicle train speed, and (iv) by estimation based on selection of a component the temperature of which can be determined in such a way that it reflects the thermal load condition of the brakes.

Referring now to FIG. 2, there is shown the process for effecting temperature dependent control of brake actuation energy in EBSs 2, 2', in addition to coupling force control, according to a preferred method of the present invention. According to the preferred method, a temperature difference value and a temperature limit value are set for the wheel brakes of the vehicle train parts (step 50). The temperatures of the wheel brakes of the tractor and trailer vehicle train parts are ascertained (step 52) and compared against one another for the respective vehicle train parts (step 54) and against the preset temperature limit value (step 56). If, during braking, the temperatures of the wheel brakes for respective vehicle train parts differ from one another by at least the preset temperature difference value (decision 58), and the temperature of the wheel brakes of at least one of the vehicle train parts reaches the temperature limit value (decision 60), brake actuation energy into the wheel brakes of the vehicle train part having higher temperatures is reduced, and brake actuation energy into the wheel brakes of the vehicle train part having lower temperatures is increased (step 62).

The coupling force control system is either deactivated (step 64) or programmed to adjust a non-zero coupling force based on the temperature-induced changes of brake actuation energy (step 66).

Additionally, it is desirable to communicate a warning signal to the vehicle train driver if the wheel brakes reach the preset temperature limit value during braking.

Accordingly, the present invention provides an improved system and method for effecting temperature dependent control of brake actuation energy in EBSs of a vehicle train equipped with a coupling force control system that compensate for the zero coupling force control objective of the coupling force control system when appropriate to prevent overheating of wheel brakes during braking and undesired reduction in braking power. By virtue of the present invention, peak temperatures of the wheel brakes (and thus also their surroundings) are lowered, the wheel brakes and wheel brake components (e.g., brake disks) are protected against undesired thermal damage and brake lining wear, and the safety of the EBSs is increased.

It will thus be seen that the objects set forth above, among those made apparent from the preceding description, are efficiently attained, and since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A method for controlling brake actuation energy in electronically controlled brake systems of a vehicle train including a first vehicle train part and at least one additional vehicle train part coupled thereto, the first vehicle train part including first wheels and first wheel brakes controlled by a first electronically controlled brake system, the at least one additional vehicle train part including additional wheels and additional wheel brakes controlled by at least one additional electronically controlled brake system, and a coupling force control system for matching deceleration of the at least one additional vehicle train part caused by the additional wheel brakes to deceleration of the first vehicle train part caused by the first wheel brakes so that at least one of a force of zero magnitude and a force of small magnitude is transmitted between the at least one additional vehicle train part and the first vehicle train part during vehicle train braking, the method comprising the steps of: setting a temperature limit value for said first wheel brakes and said additional wheel brakes in said first electronically controlled brake system and said at least one additional electronically controlled brake system, setting a temperature difference value for said first wheel brakes and said additional wheel brakes in said first electronically controlled brake system and said at least one additional electronically controlled brake system, ascertaining temperatures of said first wheel brakes and said additional wheel brakes, comparing said temperatures of said wheel brakes against one another and against said temperature limit value, if said temperatures of said first wheel brakes and said additional wheel brakes differ by said temperature difference value and at least one of said temperatures reaches said temperature limit value during vehicle train braking, reducing brake actuation energy into the wheel brakes of one of said first vehicle train part and said at least one additional vehicle train part having higher temperatures, increasing brake actuation energy into the wheel brakes of one of said first vehicle train part and said at least one additional vehicle train part having lower temperatures, and at least one of deactivating said coupling force control system and programming said coupling force control system to adjust a non-zero coupling force based on temperature-induced changes of brake actuation energy of said first vehicle train part and said at least one additional vehicle train part.

2. The method according to claim 1, further comprising the steps of calculating a first mean temperature value of said first wheel brakes based on said ascertained temperatures of said first wheel brakes and calculating an additional mean temperature value of said additional wheel brakes based on said ascertained temperatures of said additional wheel brakes for comparison with one another and with said temperature limit value.

3. The method according to claim 1, further comprising the steps of adjusting a set brake actuation energy of at least one of said first vehicle train part and said at least one additional vehicle train part based on said ascertained temperatures of said wheel brakes.

4. The method according to claim 3, wherein, if said set brake actuation energy of said at least one additional vehicle train part is lowered, said set brake actuation energy of said first vehicle train part is simultaneously raised, and, if said set brake actuation energy of said at least one additional vehicle train part is raised, said set brake actuation energy of said first vehicle train part is simultaneously lowered.

5. The method according to claim 3, wherein said step of adjusting set brake actuation energy of at least one of said first vehicle train part and said at least one additional vehicle train part results in a neutral effect on total braking power of said vehicle train.

6. The method according to claim 3, wherein said step of adjusting set brake actuation energy of at least one of said first vehicle train part and said at least one additional vehicle train part results in a reduction in total braking power of said vehicle train.

7. The method according to claim 3, wherein said set brake actuation energy is adjusted as a function of a ratio of peak temperature of at least one of said wheel brakes to a mean temperature of all of said wheel brakes.

8. The method according to claim 3, wherein said set brake actuation energy is adjusted as a function of a level of absolute peak temperatures of at least one of said wheel brakes.

9. The method according to claim 1, wherein said steps of ascertaining temperatures of said first wheel brakes and said additional wheel brakes involve measuring said temperatures using temperature sensors.

10. The method according to claim 1, wherein said steps of ascertaining temperatures of said first wheel brakes and said additional wheel brakes involve calculating said temperatures according to a temperature model which takes into consideration at least one of a brake load signal representative of a load condition of said wheel brakes, heat energy supply to said wheel brakes, deformation of component parts of said wheel brakes, and instantaneous vehicle train deceleration and vehicle train speed.

11. The method according to claim 1, wherein said brake actuation energy is distributed as a function of a ratio of peak temperature of at least one of said wheel brakes to a mean temperature of all of said wheel brakes.

12. The method according to claim 1, wherein said brake actuation energy is distributed as a function of a level of absolute peak temperatures of at least one of said wheel brakes.

13. A system for controlling brake actuation energy in electronically controlled brake systems of a vehicle train including a first vehicle train part and at least one additional vehicle train part coupled thereto, the first vehicle train part including first wheels, first wheel brakes and a first electronically controlled brake system for controlling the first wheel brakes, the at least one additional vehicle train part including additional wheels, additional wheel brakes and at least one additional electronically controlled brake system for controlling the additional wheel brakes, and a coupling force control system for matching deceleration of the at least one additional vehicle train part caused by the additional wheel brakes to deceleration of the first vehicle train part caused by the first wheel brakes so that at least one of a force of zero magnitude and a force of small magnitude is transmitted between the at least one additional vehicle train part and the first vehicle train part during vehicle train braking, the system comprising: means for setting a temperature limit value for said first wheel brakes and said additional wheel brakes in said first electronically controlled brake system and said at least one additional electronically controlled brake system, means for setting a temperature difference value for said first wheel brakes and said additional wheel brakes in said first electronically controlled brake system and said at least one additional electronically controlled brake system, means for ascertaining temperatures of said first wheel brakes and said additional wheel brakes, means for comparing said temperatures of said wheel brakes against one another and against said temperature limit value, means for reducing brake actuation energy into the wheel brakes of one of said first vehicle train part and said at least one additional vehicle train part having higher temperatures and for increasing brake actuation energy into the wheel brakes of one of said first vehicle train part and said at least one additional vehicle train part having lower temperatures if said temperatures of said first wheel brakes and said additional wheel brakes differ by at least said temperature difference value and at least one of said temperatures reaches said temperature limit value during vehicle train braking, and at least one of means for deactivating said coupling force control system and means associated with said coupling force control system for adjusting a non-zero coupling force based on temperature-induced changes of brake actuation energy of said first vehicle train part and said at least one additional vehicle train part.

14. The system according to claim 13, further comprising a brake signal transmitter for inputting a set value to at least one of said first electronically controlled brake system and said at least one additional electronically controlled brake system.

15. The system according to claim 13, wherein said means for reducing brake actuation energy into the wheel brakes of one of said first vehicle train part and said at least one additional vehicle train part having higher temperatures and for increasing brake actuation energy into the wheel brakes of one of said first vehicle train part and said at least one additional vehicle train part having lower temperatures includes at least one control unit of said first electronically controlled brake system and said at least one additional electronically controlled brake system.

16. The system according to claim 15, wherein said at least one control unit is adapted to distribute brake actuation energy as a function of a ratio of peak temperature of at least one of said wheel brakes to a mean temperature of all of said wheel brakes.

17. The system according to claim 15, wherein said at least one control unit is adapted to distribute brake actuation energy as a function of a level of absolute peak temperatures of at least one of said wheel brakes.

18. The system according to claim 15, further comprising means associated with said at least one control unit for calculating a first mean temperature value of said first wheel brakes based on said ascertained temperatures of said first wheel brakes and for calculating an additional mean temperature value of said additional wheel brakes based on said ascertained temperatures of said additional wheel brakes for comparison with one another and with said temperature limit value.

19. The system according to claim 15, further comprising means associated with said at least one control unit for adjusting a set brake actuation energy of at least one of said first vehicle train part and said at least one additional vehicle train part based on said ascertained temperatures of said wheel brakes.

20. The system according to claim 19, wherein said means associated with said at least one control unit for adjusting a set brake actuation energy of at least one of said first vehicle train part and said at least one additional vehicle train part is adapted to simultaneously raise said set brake actuation energy of said first vehicle train part if said set brake actuation energy of said at least one additional vehicle train part is lowered, and to simultaneously lower said set brake actuation energy of said first vehicle train part if said set brake actuation energy of said at least one additional vehicle train part is raised.

21. The system according to claim 20, wherein said means associated with said at least one control unit for adjusting a set brake actuation energy of at least one of said first vehicle train part and said at least one additional vehicle train part yields one of a neutral effect and reduction in total braking power of said vehicle train.

22. The system according to claim 13, wherein said means for reducing brake actuation energy into the wheel brakes of one of said first vehicle train part and said at least one additional vehicle train part having higher temperatures and for increasing brake actuation energy into the wheel brakes of one of said first vehicle train part and said at least one additional vehicle train part having lower temperatures includes at least one brake actuation energy allocation device separate from said first electronically controlled brake system and said at least one additional electronically controlled brake system.

23. The system according to claim 22, wherein said at least one brake actuation energy allocation device is adapted to distribute brake actuation energy as a function of a ratio of peak temperature of at least one of said wheel brakes to a mean temperature of all of said wheel brakes.

24. The system according to claim 22, wherein said at least one brake actuation energy allocation device is adapted to distribute brake actuation energy as a function of a level of absolute peak temperatures of at least one of said wheel brakes.

25. The system according to claim 22, further comprising means associated with said at least one brake actuation energy allocation device for calculating a first mean temperature value of said first wheel brakes based on said ascertained temperatures of said first wheel brakes and for calculating an additional mean temperature value of said additional wheel brakes based on said ascertained temperatures of said additional wheel brakes for comparison with one another and with said temperature limit value.

26. The system according to claim 22, further comprising means associated with said at least one brake actuation energy allocation device for adjusting a set brake actuation energy of at least one of said first vehicle train part and said at least one additional vehicle train part based on said ascertained temperatures of said wheel brakes.

27. The system according to claim 26, wherein said means associated with said at least one brake actuation energy allocation device for adjusting a set brake actuation energy of at least one of said first vehicle train part and said at least one additional vehicle train part is adapted to simultaneously raise said set brake actuation energy of said first vehicle train part if said set brake actuation energy of said at least one additional vehicle train part is lowered, and to simultaneously lower said set brake actuation energy of said first vehicle train part if said set brake actuation energy of said at least one additional vehicle train part is raised.

28. The system according to claim 27, wherein said means associated with said at least one brake actuation energy allocation device for adjusting a set brake actuation energy of at least one of said first vehicle train part and said at least one additional vehicle train part yields at one of a neutral effect or a reduction in total braking power of said vehicle train.

29. The system according to claim 13, wherein said means for ascertaining temperatures of said first wheel brakes and said additional wheel brakes includes at least one temperature sensor.

30. The system according to claim 13, wherein said means for ascertaining temperatures of said first wheel brakes and said additional wheel brakes includes means for calculating said temperatures according to a temperature model which takes into consideration at least one of a brake load signal representative of a load condition of said wheel brakes, heat energy supply to said wheel brakes, deformation of component parts of said wheel brakes, and instantaneous vehicle deceleration and vehicle speed.

31. A brake actuation energy control system for a vehicle train, the system comprising a first vehicle train part and at least one additional vehicle train part coupled thereto, said first vehicle train part including first wheels, first wheel brakes and a first electronically controlled brake system for controlling said first wheel brakes, said at least one additional vehicle train part including additional wheels, additional wheel brakes, at least one additional electronically controlled brake system for controlling said additional wheel brakes and a coupling force control system for matching deceleration of the at least one additional vehicle train part caused by the additional wheel brakes to deceleration of the first vehicle train part caused by the first wheel brakes so that at least one of a force of zero magnitude and a force of small magnitude is transmitted between the at least one additional vehicle train part and the first vehicle train part during vehicle train braking, means for setting a temperature limit value for said first wheel brakes and said additional wheel brakes in said first electronically controlled brake system and said at least one additional electronically controlled brake system, means for setting a temperature difference value for said first wheel brakes and said additional wheel brakes in said first electronically controlled brake system and said at least one additional electronically controlled brake system, means for ascertaining temperatures of said first wheel brakes and said additional wheel brakes, means for comparing said temperatures of said wheel brakes against one another and against said temperature limit value, means for reducing brake actuation energy into the wheel brakes of one of said first vehicle train part and said at least one additional vehicle train part having higher temperatures and for increasing brake actuation energy into the wheel brakes of one of said first vehicle train part and said at least one additional vehicle train part having lower temperatures if said temperatures of said first wheel brakes and said additional wheel brakes differ by at least said temperature difference value and at least one of said temperatures reaches said temperature limit value during vehicle train braking, and at least one of means for deactivating said coupling force control system and means associated with said coupling force control system for adjusting a non-zero coupling force based on temperature-induced changes of brake actuation energy of said first vehicle train part and said at least one additional vehicle train part.

\* \* \* \* \*